(12) United States Patent
Lee et al.

(10) Patent No.: US 8,508,331 B2
(45) Date of Patent: Aug. 13, 2013

(54) ELECTRONIC DEVICE AND METHOD OF CONTROLLING THE SAME

(75) Inventors: Haesoo Lee, Seoul (KR); Jaehong Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 283 days.

(21) Appl. No.: 13/087,129

(22) Filed: Apr. 14, 2011

(65) Prior Publication Data

US 2011/0291794 A1    Dec. 1, 2011

(30) Foreign Application Priority Data

May 27, 2010   (KR) .................. 10-2010-0049689

(51) Int. Cl.
*G05B 23/02*    (2006.01)

(52) U.S. Cl.
USPC .............. 340/3.1; 340/5.2; 340/584; 315/131

(58) Field of Classification Search
USPC ............................ 340/3.1, 5.2, 584; 315/131
See application file for complete search history.

(56) References Cited

U.S. PATENT DOCUMENTS

| | | | |
|---|---|---|---|
| 2010/0127880 A1* | 5/2010 | Schechter et al. | 340/584 |
| 2011/0140835 A1* | 6/2011 | Ishibashi | 340/5.2 |
| 2011/0187489 A1* | 8/2011 | Lee | 340/3.1 |
| 2012/0062123 A1* | 3/2012 | Jarrell et al. | 315/131 |
| 2012/0212319 A1* | 8/2012 | Ling et al. | 340/3.1 |
| 2012/0262268 A1* | 10/2012 | Mignot | 340/3.1 |

\* cited by examiner

*Primary Examiner* — Daniel Wu
*Assistant Examiner* — Israel Daramola
(74) *Attorney, Agent, or Firm* — Birch, Stewart, Kolasch & Birch, LLP

(57) ABSTRACT

An electronic device is provided that comprises a communication unit; an output unit; and a controller configured to output at least one of a first user interface and a second user interface through the output unit, in a case of entering a high rate time slot determined based on electricity rate information received through the communication unit while outputting contents through the output unit, wherein the first user interface queries whether to continuously output the contents through the output unit and wherein the second user interface is to receive a selection associated with a replacement electronic device for outputting the contents.

19 Claims, 13 Drawing Sheets

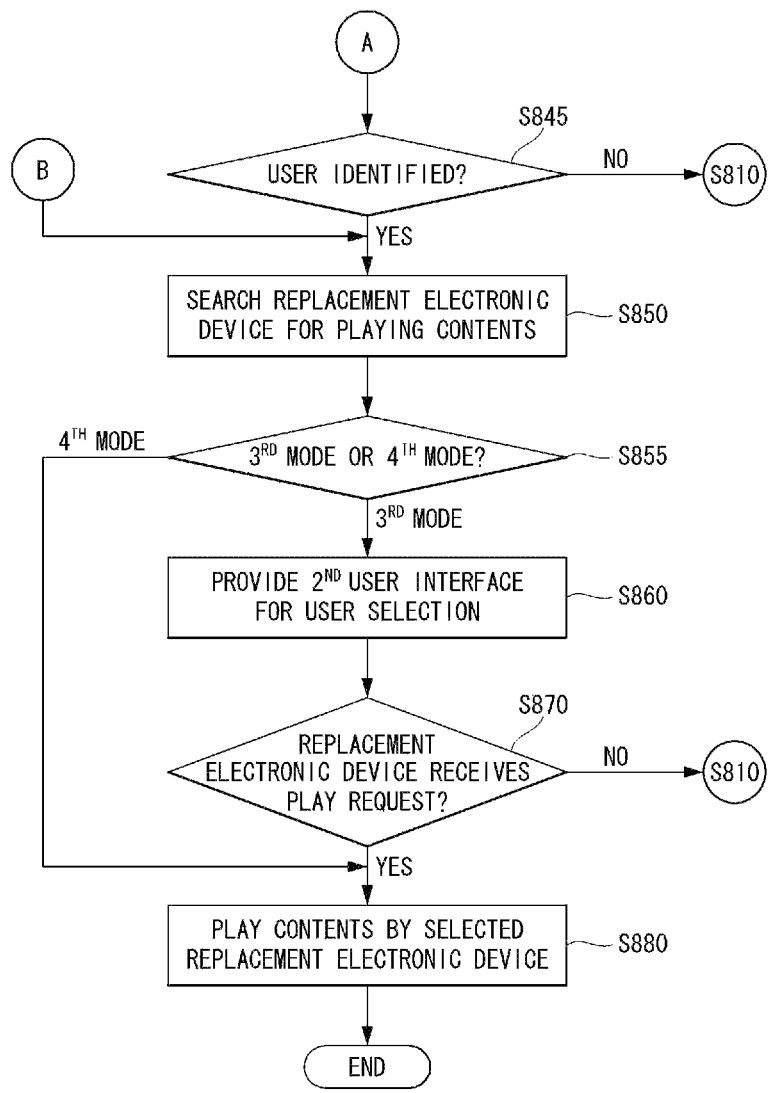

ELECTRONIC DEVICE AND METHOD OF CONTROLLING THE SAME

This non provisional application claims priority under 35 U.S.C. §119(a) on Korea Patent Application No. 10-2010-0049689 filed in Republic of Korea on May 27, 2010, the entire contents of which are hereby incorporated by reference.

BACKGROUND

1. Field

The present disclosure is directed to an electronic device having an energy saving function and a method of controlling the electronic device.

2. Related Art

The introduction of smart grids for efficient use of electric power in places requiring electric power may lead to a differential pricing system in which electricity rates are varied based on electricity demand. There is a need for developing a technology that may efficiently control various home electronic devices according to the introduction of smart grids.

SUMMARY

Exemplary embodiments of the present invention provide an electronic device that may save electricity rates and a method of controlling the electronic device.

The present is not limited to the above embodiments. Other embodiments of the present invention will become apparent by one or ordinary skill in the art from the detailed description in conjunction with the accompanying drawings.

According to an embodiment of the present invention, there is provided an electronic device comprising a communication unit; an output unit; and a controller configured to output at least one of a first user interface and a second user interface through the output unit, in a case of entering a high rate time slot determined based on electricity rate information received through the communication unit while outputting contents through the output unit, wherein the first user interface queries whether to continuously output the contents through the output unit and wherein the second user interface is to receive a selection associated with a replacement electronic device for outputting the contents.

According to an embodiment of the present invention, there is provided an electronic device comprising a communication unit; an output unit; and a controller configured to automatically selects a replacement electronic device to output contents in a case of entering a high rate time slot according to electricity rate information received through the communication unit, and when the selected replacement electronic device is in an off state, transmits an ON command for turning on the selected replacement electronic device and source information for providing the contents to the selected replacement electronic device through the communication unit, wherein the source information includes at least one of website information and broadcast information including a broadcast channel.

According to an embodiment of the present invention, there is provided a method for changing content playing devices, the method comprising: outputting contents through an output unit; receiving electricity rate information through a communication unit; and outputting at least one of a first user interface and a second user interface through the output unit in a case entering a high rate time slot determined based on the electricity rate information received through the communication unit, wherein the first user interface queries whether to continuously outputs the contents through the output unit and wherein the second interface is to receive a selection associated with a replacement electronic device for outputting the contents.

According to an embodiment of the present invention, there is provided a method for changing content playing devices, the method comprising: outputting contents through an output unit; receiving electricity rate information through a communication unit; automatically selecting a replacement electronic device to output the contents in a case of entering a high rate time slot determined based on the received electricity rate information; and transmitting an ON command for turning on the selected replacement electronic device and source information for providing the contents to the selected replacement electronic device through the communication unit when the selected replacement electronic device is in an off state, wherein the source information includes at least one of website information and broadcast information including a broadcast channel.

According to the embodiments of the present invention, a current electronic device may be changed to an electronic device consuming less power than the current electronic device while viewing contents, thus saving electricity rates, and a user may be induced to reduce power consumption during a time slot consuming more power, thus saving power consumption.

BRIEF DESCRIPTION OF THE DRAWINGS

The implementation of this document will be described in detail with reference to the following drawings in which like numerals refer to like elements.

FIGS. 8A and 8B are flowcharts illustrating a method of controlling an electronic device according to an embodiment of the present invention.

DETAILED DESCRIPTION

Figure 1:
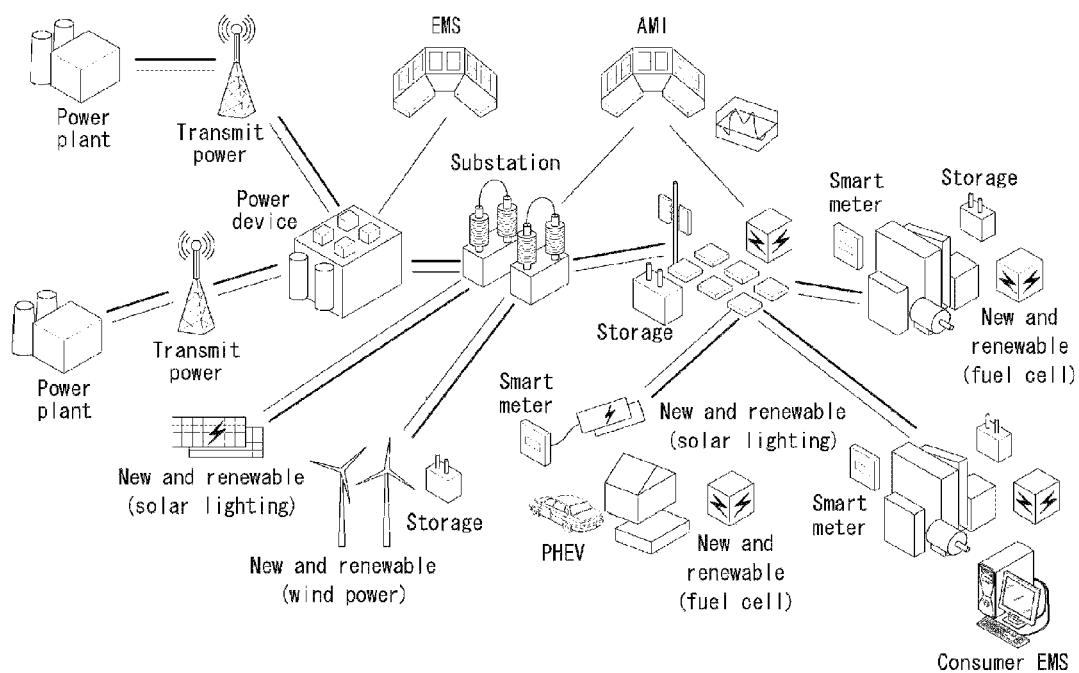
FIG. 1 is a view schematically illustrating a smart grid.

Hereinafter, exemplary embodiments of the present invention will be described with reference to the accompanying drawings, wherein like reference numerals are used to denote the same or substantially the same elements throughout the drawings and the specification.

FIG. 1 is a view schematically illustrating a smart grid. The smart grid includes a power plant, for example, such as a thermal power plant, a nuclear power plant, a hydroelectric power plant, a solar power plant, a wind power plant, etc.

The thermal power plant, the nuclear power plant, or the hydroelectric power plant supplies electricity to a power operation through power lines. The power operation carries electricity to a substation to distribute electricity to customers, such as homes or offices.

Electricity generated by new renewable energy sources is also supplied to the substation. The electricity is distributed from the substation to offices or homes via a power storage device.

Homes using a home area network (HAN) may generate electricity from solar panels or fuel cells mounted in a plug-in hybrid electric vehicles (PHEV) to utilize the generated electricity for themselves or to sell remaining electricity to other customers.

A smart meter is installed at each of the homes or offices to provide a user with power consumption and electricity rates in real time. The user may establish an electricity use plan based on the power consumption and electricity rates.

A bi-directional communication may be possible between the power plant, the power operation, the power storage device, and the customer. Accordingly, it is possible not only to unilaterally supply electricity to the customer but also to notify a circumstance of the customer to the power storage device, the power operation, or the power plant. Thus, electricity generation and electricity distribution may be carried out suitably to the customer's circumstance.

The smart grid includes an energy management system (EMS) and an advanced metering infrastructure (AMI). The EMS performs real-time power management for the customers and real-time anticipation of required power. The AMI measures power consumption in real time.

Metering devices used for a smart grid include an open-architecture based technology for encompassing customers so that a customer may efficiently use electricity and a power provider may effectively operate a system by monitoring any problems with the system.

The term "open architecture" herein refers to a standard under which electric devices produced from any manufacturers may be connected to one another over the smart grid network unlike a general communication network.

Accordingly, the metering devices used for the smart grid enables a customer-friendly efficiency concept, such as "Prices to Devices".

That is, price signals are related from an electricity market to each home in real time by an EMS installed in the home. The EMS may communicate with each electric device to control the device. A user may be aware of power information on each electric device by referring to the EMS and may perform a power information process, such as setup of a limit to power consumption or electricity rate, based on the power information, thus saving energy or rates.

The EMS may include a local EMS used for homes or offices and a central EMS that bi-laterally communicates with the local EMS to treat information collected by the local EMS.

Since power information may be communicated in real time between a supplier and a customer over the smart grid, a "real-time power network reaction" may be realized, thus saving high costs required for estimating a peak demand.

Figure 2:
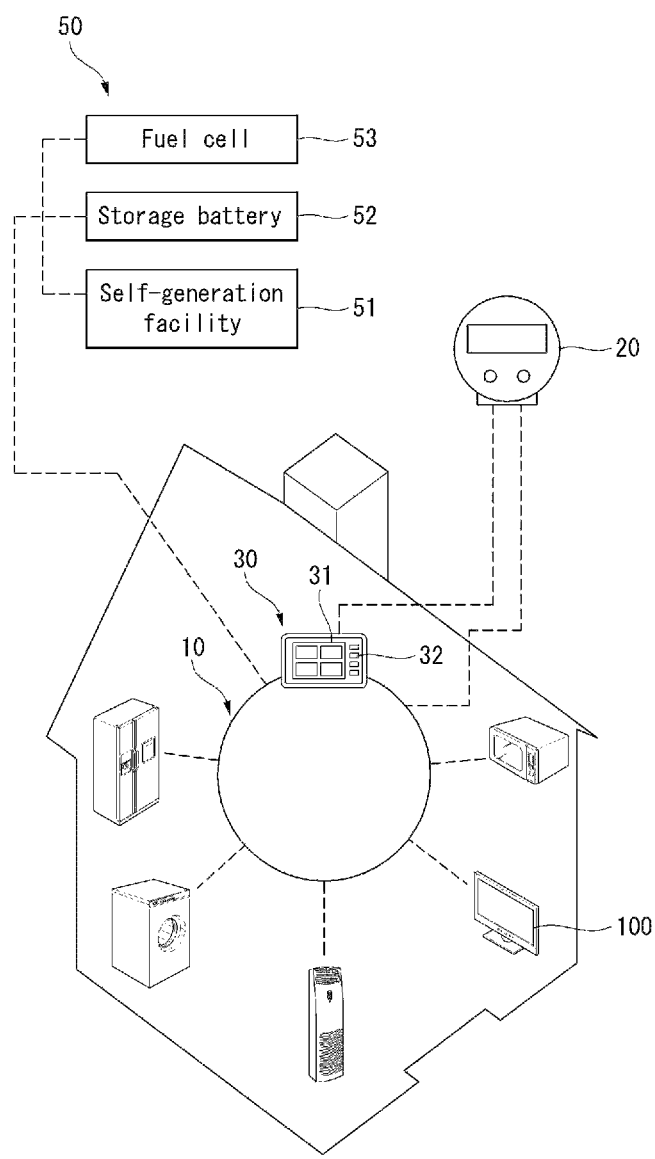
FIG. 2 is a view illustrating a power management network of a home that is a main customer of a smart grid service.

FIG. 2 is a view illustrating a power management network 10 of a home that is a main customer of a smart grid service.

The power management network 10 includes a smart meter 20 that may measure electricity supplied to the home and an electricity rate in real time and an EMS 30.

The electricity rate may be charged on an hourly basis. While power consumption is sharply increased, the per-hour electricity rate may be increased, and while power consumption is relatively small, such as a late night time, the per-hour electricity rate may be decreased.

The EMS 30 may include a terminal having an input button 32 that may be manipulated by a user.

The EMS 30 or the metering device (smart meter) 20 may be connected to an electronic device, such as a DTV (Digital Television, 100), a refrigerator, a washing machine, a drier, an air conditioner, a cooker, an illuminating device, or a light shielding device, to bi-directionally communicate with the electronic device.

For example, the smart meter (metering device) 20 may measure power consumed in the electronic device. For example, the smart meter (metering device) 20 may be included in the electronic device or may be provided separately from the electronic device.

The smart meter (metering device) 20 may transmit information on measured power consumption to the EMS 30 so that the information on the power consumption measured by the smart meter 20 may be integrally managed.

The EMS 30 may perform overall management on power in a local network, for example, in a house.

For example, the EMS 30 may integrally manage information related to power consumption of each electronic device from the smart meter 20.

For example, the EMS 30 may manage information on electricity rate. In other words, the EMS 30 may receive information on electricity rate from an external server.

For example, the EMS 30 may manage power consumed in electronic devices included in the power management network 10 and may supply electric power to the electronic devices, and may sometimes control the operation of the electronic devices.

The EMS 30 may be also referred to as the local energy managing device mentioned above. The EMS 30 installed in a house may be also referred to as a smart server.

Communication in a house may be performed in a wireless or wired manner, such as PLC (Power Line Communication). The electronic devices may be connected to one another to communicate with one another.

The power management network 10 includes an auxiliary power supply 50 prepared in the home. The auxiliary power supply 50 includes a self power generating facility 51, such as a solar power generation unit, and a storage battery 52 that stores electricity generated by the self power generating facility 51.

The auxiliary power supply 50 includes a fuel cell 53.

The auxiliary power supply 50 supplies electricity to the home while the home does not receive electricity from an external power supply, such as a power provider.

The smart meter 20 or the EMS 30 displays the amount of power that may be supplied from the auxiliary power supply 50 or the amount of power that is stored in the auxiliary power supply 50.

Figure 3:
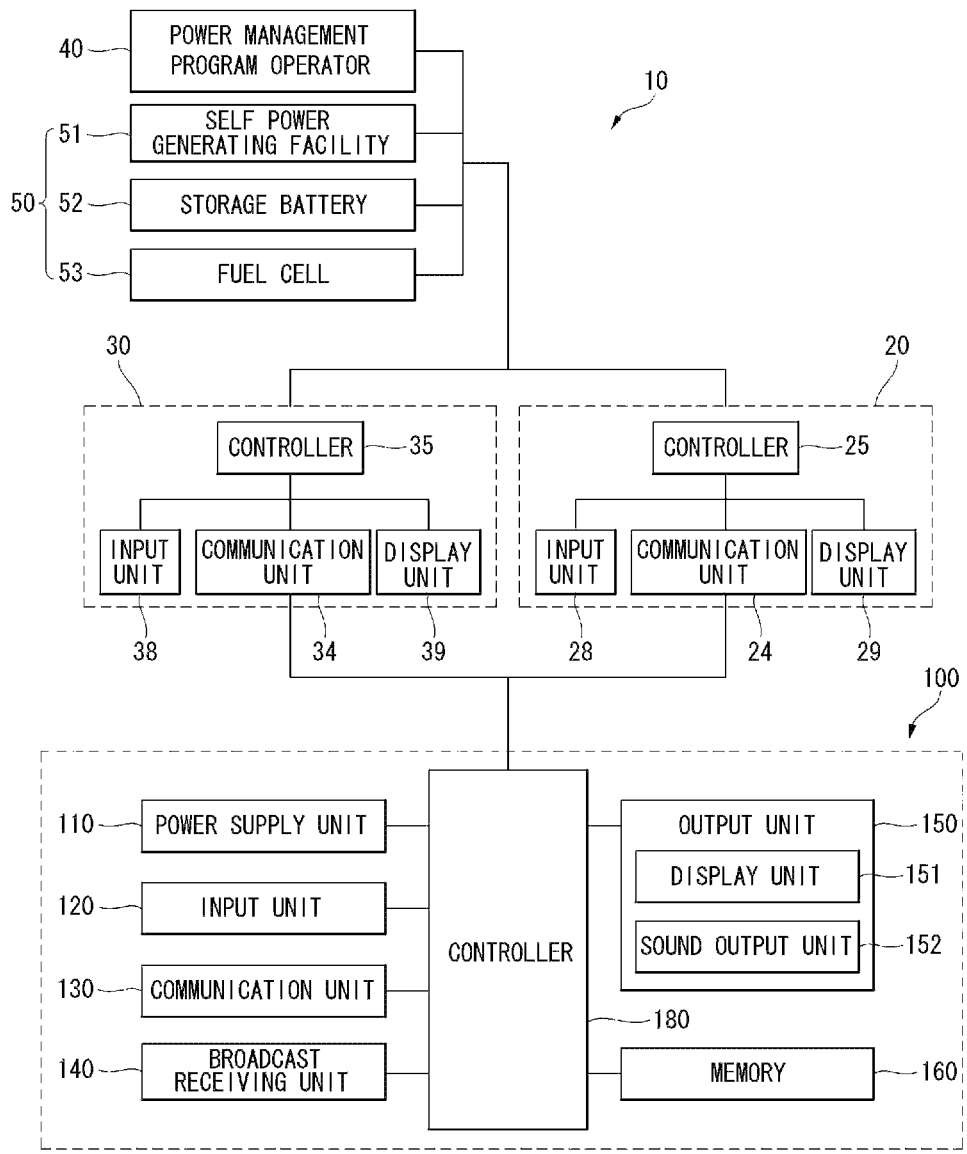
FIG. 3 is a block diagram illustrating the power management network and a DTV connected to the power management network.

FIG. 3 is a block diagram illustrating the power management network 10 and a DTV 100 connected to the power management network 10.

A power management program operator 40 is a power provider that includes a general power plant, such as thermal, nuclear, or hydroelectric power plant, or a power plant using new renewable energy sources, such as sunlight, wind, or geothermal heat. However, the present invention is not limited thereto.

The power management program operator 40 supplies electricity and information on a differential pricing system to each home so that a user may establish a strategy for saving electricity rates based on the information.

Further, the power management program operator 40 provides the user with a guide for saving electricity rates. For example, the power management program operator 40 may suggest a reference for a high rate time slot so that the user may reasonably consume electricity. A power supply of the power management program operator 40 is hereinafter referred to as "external power supply".

The "high rate time slot" refers to a time slot during which a per-hour electricity rate is more than a predetermined rate due to the explosion in power demand so that the electricity rate is sharply increased.

The auxiliary power supply 50 supplies electricity to the home separately from the external power supply. The auxiliary power supply 50 and the external power supply are connected to the smart meter 20 and the EMS 30 to communicate with the smart meter 20 and the EMS 30. The smart meter 20 and the EMS 30 may communicate with the electronic devices. According to an embodiment, each of the electronic devices may have a power supply unit that receives electricity from the external power supply and/or the auxiliary power supply 50.

The EMS 30 includes a controller 35, an input unit 38, a communication unit 34, and a display unit 39. The smart meter 20 includes a controller 25, an input unit 28, a communication unit 24, and a display unit 29.

The EMS 30 or the smart meter 20 is connected to the DTV 100 to communicate with the DTV 100. The DTV 100 includes a communication unit 130 that may communicate with the communication unit 34 of the EMS 30 or the communication unit 24 of the smart meter 20.

The communication unit 130 of the DTV 100 receives power information, such as electricity rate information, that varies in real time from the EMS 30 or the smart meter 20.

Referring to FIG. 3, the DTV 100 further includes a power supply unit 110, an input unit 120, a broadcast receiving unit 140, an output unit 150, a memory 160, and a controller 180.

The power supply unit 110 receives electricity from the external power supply and/or the auxiliary power supply 50 and supplies necessary electricity to the components of the DTV 100.

The input unit 120 generates input data allowing a user to control the operation of the power management network 10.

The communication unit 130 receives power information associated with the smart grid (hereinafter, referred to as "smart grid information"), such as electricity rate information, from the smart meter 20 or the smart server 30. According to an embodiment, the communication unit 130 may include one or more module that allows for communication between the DTV 100 and a network (for example, Internet).

According to an embodiment, the communication unit 130 may receive smart grid information in a wired manner, such as Ethernet or PLC, or in a wireless manner, such as Zigbee.

The smart grid information includes the electricity rate information. According to an embodiment, the smart grid may include various sources and various transmission/receipt methods.

For example, the communication unit 130 may receive the smart grid information from a smart operation center 11 or a specific server that will be described below with reference to FIG. 4.

Specifically, the smart meter 20 or the smart server 30 receives the smart grid information from the smart operation center 11 or the specific server and thus the communication unit 130 may receive the smart grid information from the smart meter or the smart server.

According to an embodiment, the communication unit 130 may receive the smart grid information through various communication protocols, such as various wired or wireless protocols, including mobile Internet protocols and mobile communication network protocols.

The broadcast receiving unit 140 receives a broadcast signal and/or broadcast-related information from an external broadcast management server through a broadcast channel.

According to an embodiment, the broadcast channel may include a satellite channel and/or a terrestrial channel. According to an embodiment, the broadcast management server may include a server that generates a broadcast signal and/or broadcast-related information and transmits the generated signal and/or information to a terminal, such as the DTV 100, or a server that receives a previously generated broadcast signal and/or broadcast-related signal and transmits the received signal and/or information to the terminal. According to an embodiment, the broadcast signal may include a TV broadcast signal, a radio broadcast signal, a data broadcast signal, or a combined broadcast signal of a TV broadcast signal, a radio broadcast signal, and a data broadcast signal.

According to an embodiment, the broadcast-related information may include information on a broadcast channel, a broadcast program, or a broadcast service provider.

For example, the broadcast-related information may include an electronic program guide (EPG) or an electronic service guide (ESG).

The broadcast receiving unit 140 receives a broadcast signal through various broadcast systems. According to an embodiment, the broadcast receiving unit 140 may be configured to be suitable for a digital broadcast system or other broadcast systems providing the broadcast signal.

According to an embodiment, the DTV 100 may not include the broadcast receiving unit 140. The broadcast receiving unit 140 may be independently provided outside of the DTV 100, and may perform wired/wireless communication with the DTV 100. The controller 180 may process data received through the broadcast receiving unit 140. For example, the broadcast receiving unit 140 may be included in a set-top box (not shown) connected to the DTV 100.

The broadcast signal and/or the broadcast-related information received through the broadcast receiving unit 140 are stored in the memory 160.

The output unit 150 generates a visual, auditory, or tactile output. The output unit 150 includes a display unit 151 and a sound output unit 152. According to an embodiment, the output unit 150 may further include a haptic module that generates a tactile output (for example, vibration).

The display unit 151 displays information processed by the DTV 100.

According to an embodiment, the display unit 151 may include at least one of a liquid crystal display (LCD), a thin film transistor-liquid crystal display (TFT-LCD), an organic light-emitting diode (OLED) display, a flexible display, and a 3-dimensional display.

According to an embodiment, two or more display units 151 may be provided in the DTV 100.

According to an embodiment, the DTV 100 may not include the display unit 151 and the display unit 151 may be provided separately from the DTV 100. The controller 180 may control the display unit 151 wiredly or wirelessly.

According to an embodiment, in cases where the display unit 151 is provided separately from the DTV 100, the DTV 100 and the display unit 151 may or may not share a power supply source.

The sound output unit 152 outputs audio data that is received from an external source (not shown) or generated by the DTV 100. For example, the sound output unit 152 outputs a sound signal associated with a function performed by the DTV 100.

According to an embodiment, the sound output unit 152 may include a speaker or a buzzer, and may output a sound through an earphone jack so that a user may listen to the sound by using an earphone connected to the earphone jack.

The memory 160 stores a program for an operation of the controller 180 and temporarily or permanently stores input/output data, such as audios, still images, moving pictures, broadcast-related information, etc.

According to an embodiment, the memory 160 may include at least one of storage media including a flash memory, a hard disk, a micro multimedia card type memory, a card type memory, such as a SD or XD memory, a random access memory (RAM), a static random access memory (SRAM), a read-only memory (ROM), an electrically erasable programmable read-only memory (EEPROM), a programmable read-only memory (PROM), a magnetic type memory, a magnetic disk, and an optical disk.

According to an embodiment, the memory 160 may be provided separately from the DTV 100. For example, a digital video recorder (DVR) serving as the memory 160 is provided separately from the DTV 100.

The memory 160 may also be refereed to as "storage".

According to an embodiment, the DTV 100 may be operated in association with a web storage that performs a storage function of the memory 160 over the Internet.

The controller 180 controls a general operation of the DTV 100. For example, the controller 180 performs control and processing associated with, for example, broadcast receipt, broadcast recording, or access to the Internet.

According to an embodiment, the controller 180 may include a multimedia module for playing multimedia. The multimedia module may be provided in the controller 180 or separately from the controller 180. The multimedia module may include an audio/video decoder.

The exemplary embodiments described herein may be implemented in software, hardware, or a combination thereof, or implemented in a recording medium that may be read by a computer or a similar device thereof.

When implemented in hardware, the embodiments may be embodied by at least one of an application specific integrated circuit (ASIC), a digital signal processor (DSP), a digital signal processing device (DSPD), a programmable logic device (PLD), a field programmable gate array (FPGA), a processor, a controller, a microcontroller, a microprocessor, and an electrical unit for performing a function. The embodiments may also be implemented by the controller 180.

When implemented in software, the embodiments may be embodied by separate software codes or modules, each performing a function or operation. The software codes may be implemented by a software application written in a proper program language. The software codes may be stored and executed by the controller 180.

Figure 4:
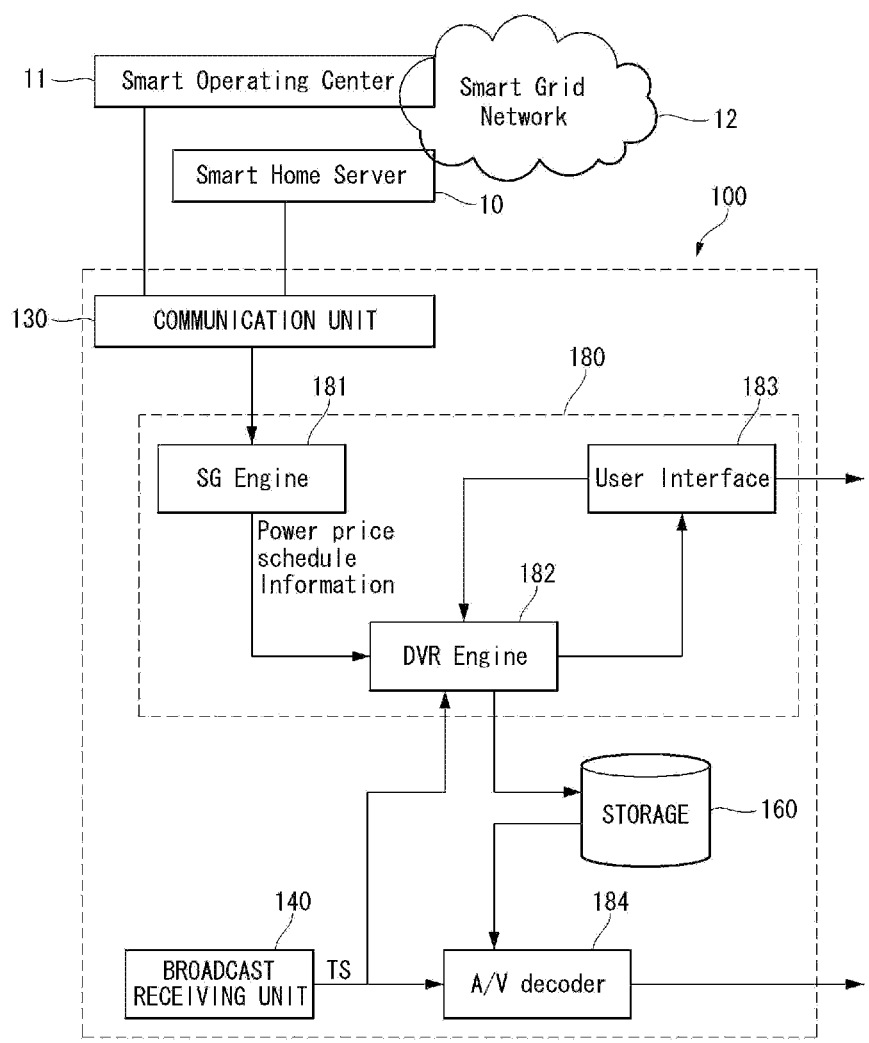
FIG. 4 is a view illustrating the DTV in association with smart grid information and broadcast contents.

FIG. 4 is a view illustrating the DTV 100 in association with smart grid information and broadcast contents.

Referring to FIG. 4, the controller 180 of the DTV 100 includes a smart grid engine 181, a DVR engine 182, and a UI processing unit 183.

The smart grid engine 181 processes the smart grid information received through the communication unit 130 to be capable of being used by the DTV 100 and stores the processed information in the storage 160 that is provided in or outside of the DTV 100.

As shown in FIG. 4, the communication unit 130 may receive the smart grid information through the smart operation center 11 provided outside of the home over the smart grid network 12. As described above, the communication unit 130 may receive via the smart server 30 the smart grid information transmitted from the smart operation center 11.

The smart operation center 11 includes the EMS (refer to FIG. 1) provided outside of the home, and the smart server 30 includes the EMS 30 shown in FIG. 2, as described above.

The DVR engine 182 performs a function associated with storage of the broadcast contents, such as generation of information necessary for storage of the broadcast contents.

For example, according to an embodiment, the DVR engine 182 may receive broadcast contents requested by the UI processing unit 183 through the broadcast receiving unit 140 in the form of transport streams (TSs) and may store the received broadcast contents in the storage 160.

According to an embodiment, the DVR engine 182 may calculate an optimum time for viewing the broadcast contents stored in the storage 160 using the smart grid information processed and stored by the smart grid engine 181 and may notify a user of arrival of the optimum time.

The UI processing unit 183 performs functions associated with generation, storage, and output of various user interfaces to be described below and a function of processing a user input received through the user interfaces.

The DTV 100 further includes an A/V decoder 184. According to an embodiment, the A/V decoder 184 may be provided in the controller 180 or as a module separate from the controller 180.

The A/V decoder 184 decodes and outputs transmission streams received through the broadcast receiving unit 140 or the contents stored in the memory 160.

Although it has been described that the DTV is used as an example and all of the components are integrally included in the DTV, the embodiment of the present invention is not limited thereto. According to an embodiment, some of the components may be provided independently from the DTV and may be included in a separate device, such as a set-top box. It is apparent to one of ordinary skill in the art that the embodiment of the present invention may be achieved by interworking of the DTV and the set-top box.

Although it has been described that the DTV 100 is used as an electronic device in the home, the present invention is not limited thereto. Hereinafter, various exemplary embodiments using the DTV 100 will be described.

Figure 5:
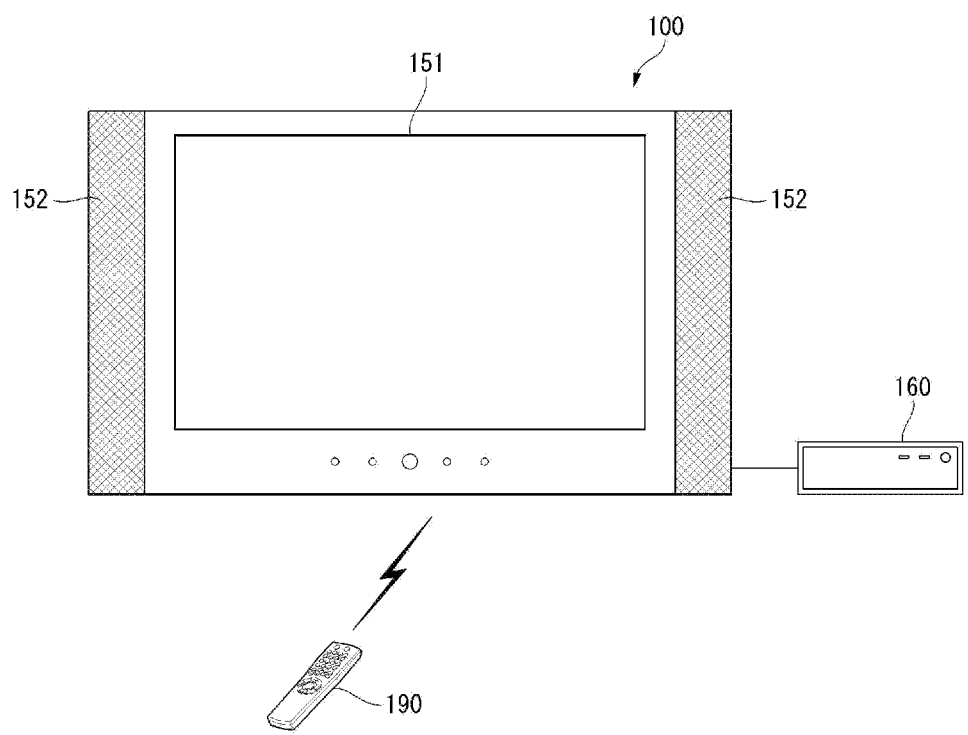
FIG. 5 is a view illustrating an example of installing the DTV and the storage.

FIG. 5 is a view illustrating an example of installing the DTV 100 and the storage 160. As described above, the storage 160 serves as the memory 160 and may be provided separately from the DTV 100.

Referring to FIG. 5, a user controls the DTV 100 using a remote controller 190.

Although it has been described in connection with FIG. 5 that a user uses the separate remote controller 190 to control an electronic device, such as the DTV 100, the embodiment of the present invention is not limited thereto. According to embodiments, the user may control the electronic device by a user's motion, gesture, or voice without the need of the remote controller 190, which is apparent to one of ordinary skill in the art.

According to the embodiments of the present invention, electronic devices of outputting contents may be changed considering electricity rates included in the received smart grid information, thus saving electricity rates. Compatibility is required between electronic devices of outputting the contents to change the electronic devices. Hereinafter, a DLNA (Digital Living Network Alliance) network will be described for compatibility and contents sharing between the electronic devices. However, the DLNA network is merely an example, and other networks, such as UPnP (Universal Plug and Play) networks, may also be further included or employed.

Figure 6:
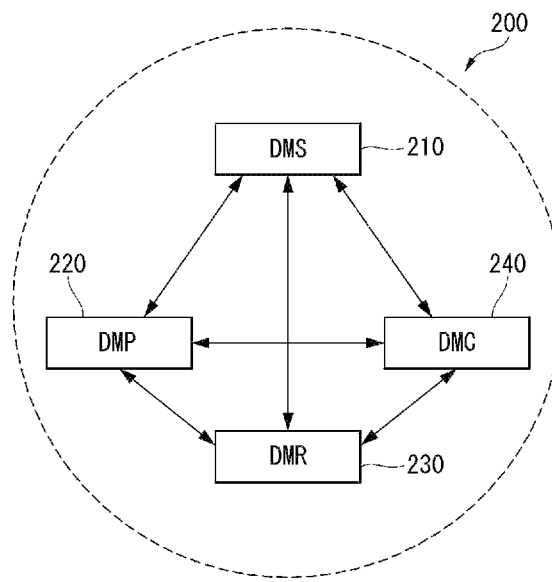
FIG. 6 is a concept view of a DLNA network.

FIG. 6 is a conceptual view of a DLNA network.

The DLNA (Digital Living Network Alliance) is a standardization organization for allowing contents, such as music, moving pictures, or still images, to be mutually shared over a network.

The DLNA network is based on a UPnP (Universal Plug and Play) protocol.

The DLNA network 200 may include a digital media server (DMS) 210, a digital media player (DMP) 220, a digital media renderer (DMR) 230, and a digital media controller (DMC) 240.

The DLNA network 200 may include one or more DMS 210, one or more DMP 220, one or more DMR 230, and one or more DMC 240. The DLNA may provide a standard through which the devices may be compatible with one another. The DLNA network 200 may provide a standard through which the DMS 210, the DMP 220, the DMR 230, and the DMC 240 may be compatible with one another.

The DMS 210 may provide digital media contents. The DMS 210 may store and manage contents. The DMS 210 may receive various commands from the DMC 240 and may carry out the commands. For example, when receiving a play command, the DMS 210 may search contents to be played and may provide the contents to the DMR 230. The DMS 210 may include, for example, a PC, a PVR (Personal Video Recorder), and a set-top box.

The DMS 210 may be positioned in the home network or outside of the home network. The physical location of a device providing contents is not limited to "in the home network".

The DMP 220 may control contents or electronic devices, or enables contents to be played. For example, the DMP 220 may perform functions of the DMR 230 for play and functions of the DMC 240 for control. The DMP 220 may include, for example, a TV, a DTV, or a home theater.

The DMR 230 may play contents. For example, the DMR 230 may play contents received from the DMS 210. The DMR 230 may include, for example, an electronic photo frame.

The DMC 240 may provide a control function. The DMC 240 may include, for example, a mobile phone and a PDA.

The DLNA network 200 may include the DMS 210, the DMR 230, and the DMC 240, or may include the DMP 220 and the DMR 230.

The DMS 210, the DMP 220, the DMR 230, and the DMC 240 may be terms for differentiating electronic devices in terms of functionality. For example, in a case where a mobile phone has both a play function and a control function, the mobile phone may correspond to the DMP 220, and in a case where the DTV 100 manages contents, the DTV 100 may correspond to the DMS 210 as well as the DMP 220. For example, in a case where the above-described energy managing device 30, i.e., the smart server 30, provides contents, the energy managing device may correspond to the DMS 210. For example, the smart server 30 may function as a multifunctional server that provides contents and has electric power managing functions.

Figure 7:
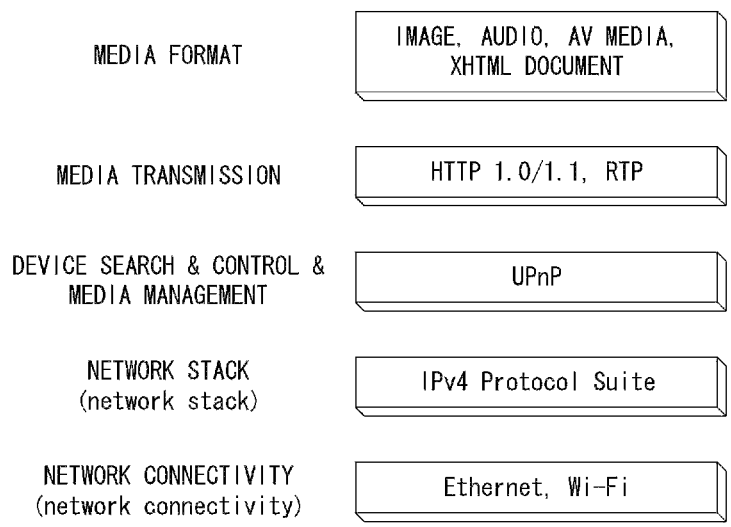
FIG. 7 is a view illustrating functional layers of a DLNA network.

FIG. 7 illustrates functional components according to the DLNA.

The functional components may include a media format layer, a media transport layer, a device discovery & control and media management layer, a network stack layer, and a network connectivity layer.

The network connectivity layer may include a physical layer and a link layer of a network. The network connectivity layer may include Ethernet, Wi-Fi, and Bluetooth. Besides, the network connectivity layer may use a communication medium that may perform IP access.

The network stack layer may use at least one of an IPv4 protocol or IPv6 protocol.

The device discovery & control and media management layer may be based on UPnP, particularly on UPnP AV architecture and UPnP device architecture. For example, an SSDP (Simple Service Discovery Protocol) may be used for device discovery. An SOAP (Simple Object Access Protocol) may be used for control.

The media transport layer may use HTTP 1.0/1.1 for stream playing. The media transport layer may also use a RTP (Real-time Transport Protocol).

The media format layer may use images, audios, AV media, XHTML (Extensible Hyper Text Markup Language) documents.

Exemplary embodiments of changing a playing device based on smart grid information will now be described in greater detail.

Figure 8A:
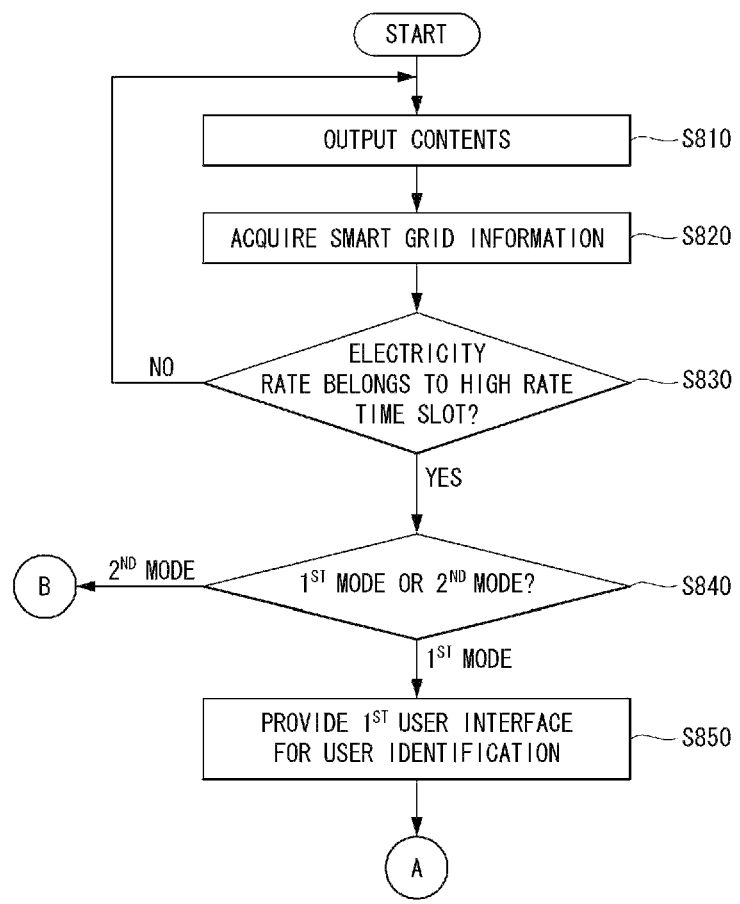

FIGS. 8A and 8B are flowcharts illustrating a method of controlling an electronic device according to an embodiment of the present invention. FIGS. 9 to 15 are views illustrating a method of controlling an electronic device according to an embodiment of the present invention.

A method of controlling an electronic device according to an embodiment of the present invention may be implemented in the environment and the DTV 100 as described in connection with FIGS. 1 to 7. Hereinafter, the method and an operation of the DTV 100 will be described in greater detail with reference to the accompanying drawings. Although the DTV 100 is employed for this embodiment for convenience of description, the embodiment of the present invention is not limited thereto.

Referring to FIG. 8A, the controller 180 may enable the A/V decoder 184 to decode broadcast contents received through the broadcast receiving unit 140 and then may enable the output unit 150 to output the decoded contents (S810). For example, as a result of step S810, a user may view real-time broadcast contents.

The contents outputted by the output unit 150 may include various contents, such as, for example, any types of contents as well as the above-mentioned real-time broadcast contents.

For example, the contents may be contents stored in the memory 160 of the DTV 100, or may be contents stored in the external storage 160. For example, the contents may be contents stored in the DMS 210 located at least inside or outside of a home network. For example, the contents may be contents stored in the smart server 30.

For convenience of description, it is hereinafter assumed, unless otherwise specified, that the "broadcast contents" include contents stored in the memory 160 of the DTV 100, the external storage 160, or the DMS 210, as well as broadcast contents as originally meant.

The controller 180 may obtain smart grid information through the communication unit 130 (S820). As described above, the smart grid information may include electricity rate information. The electricity rate information may include per-time slot electricity rates. The per-time slot electricity rate is electricity rate by time period.

As described above, the controller 180 may obtain the smart grid information from the smart meter 20 or the smart server 30.

The controller 180 may determine whether an electricity rate for a current time has entered into a high rate time slot by referring to the smart grid information (S830).

The high rate time slot may be set by at least one of a user, the power management network 10, or a power provider, such as a power company.

The high rate time slot may be determined based on a reference value that may be arbitrarily set by a user. The reference value may be a most expensive electricity rate among per-time slot electricity rates, or may be a percentage of the most expensive electricity rate, for example, 80% of the most expensive electricity rate. If the electricity rate is higher than the reference value, it is determined that the electricity rate enters into the high rate time slot.

The reference value may be calculated or set by statistically analyzing electricity rate information included in the received smart grid information for a predetermined time period.

For example, the controller 180 may obtain information on the most expensive electricity rate by analyzing electricity rate information included in the smart grid information for a predetermined time period. For example, the most expensive electricity rate is considered as the reference value, and when received electricity rate is higher than the reference value, then the current time slot may be considered as the high rate time slot.

According to an embodiment, the controller 180 may periodically (for example, monthly, quarterly, or half-yearly) or non-periodically update the reference value. A. The reference value may be determined based on high rate charging information and demand information received from a power company. For example, the high rate charging information may include information saying that an electricity rate of a current time belongs to a high rate time slot. For example, the demand information may include information on a current or future power demand. When a power demand is more than a predetermined reference value, the controller 180 may determine that the current time belongs to the high rate time slot based on the demand information.

When it is determined in step S830 that the electricity rate of the current time is lower than the reference value, the controller 180 may return the process to step S810 because the current time does not belong to the high rate time slot.

When it is determined in step S830 that the electricity rate enters into the high rate time slot, the controller 180 may determine whether a current setup is in a first mode or a second mode (S837).

The first mode may be a mode in which the controller 180 confirms whether a user will change an electronic device, for example, the DTV 100, outputting the contents to another electronic device.

The second mode may be a mode set to change an electronic device outputting the contents to a replacement electronic device.

The first mode or the second mode may be changed by a user's setup or may be previously set by the DTV 100.

Figure 9:
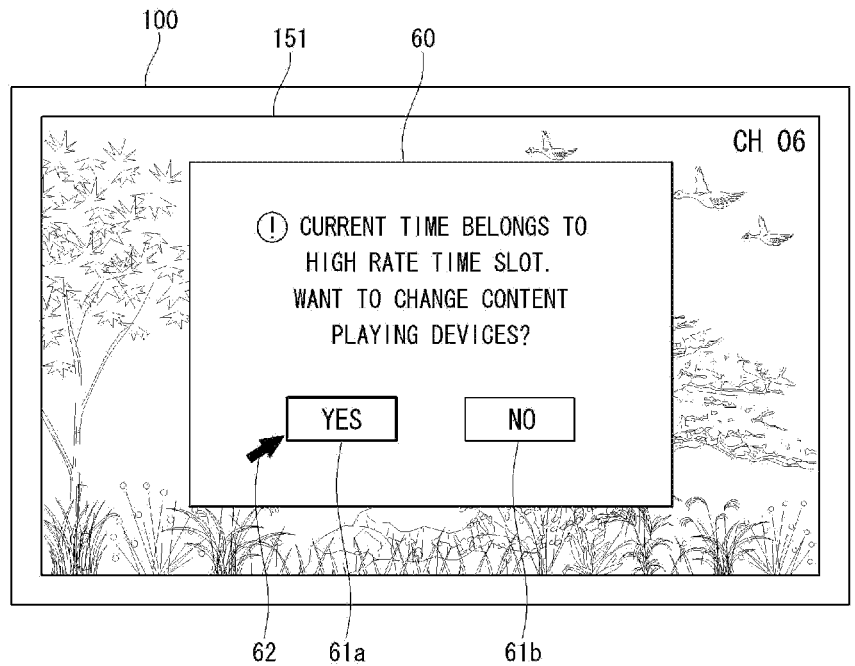
FIGS. 9 to 15 are views illustrating a method of controlling an electronic device according to an embodiment of the present invention.

When it is determined in step S837 that a current setup is in the first mode, the controller 180 may provide a first user interface 60 shown in FIG. 9 for user's confirmation (S840).

The first user interface 60 may be an interface for querying a user whether to continuously view the contents through the DTV 100 currently outputting the contents or to let the replacement electronic device output the contents for the high rate time slot.

FIG. 9 illustrates an example of showing the first user interface 60 on the screen.

Referring to FIG. 9, the first user interface 60 may include an icon 61a corresponding to "YES" and an icon 61b corresponding to "NO".

A user may manipulate the remote controller 190 to select one of the icons 61a and 61b.

For example, the user may select one of the icons 61a and 61b by manipulating the remote controller 190 to move a cursor 62 to one of the icons 61a and 61b on the display unit 151 and then pressing an enter key included in the remote controller 190.

For example, the user may select one of the icons 61a and 61b by pressing one of key buttons corresponding to the icons 61a and 61b among key buttons included in the remote controller 190.

According to an embodiment, the user may also select one of the icons 61a and 61b using a user's motion, gesture, or voice other than using the remote controller 190.

The first user interface 60 may also be displayed not only on the DTV 100 but also on other electronic devices, such as a mobile phone, a monitor, a smart phone, an e-book, an electronic photo frame, or a smart pad, which may transmit and receive control signals to/from the DTV 100. The controller 180 may receive a confirmation on whether to change playing devices through the first user interface 60 provided in step S840 (S845).

When the user does not want to change playing devices and thus selects the icon 61b corresponding to "NO" through the first user interface 60, the controller 180 may return the process to step S810.

When the user wants to change playing devices and thus selects the icon 61a corresponding to "YES" through the first user interface 60, the controller 180 may search replacement electronic devices to output the contents through the replacement electronic devices (S850). That is, if "YES" is selected, the DTV 100 regards this selection as an output stop signal indicating stop to play the contents.

When it is determined in step S837 that the current time is in the second mode, the controller 180 may enter into step S850.

The controller 180 may search other electronic devices consuming less power than the DTV 100 currently outputting the contents, i.e. the replacement electronic devices.

The replacement electronic devices may be electronic devices that consume less power than the DTV 100 currently outputting the contents. The replacement electronic devices may be electronic devices belongs to the DLNA network in a case where the DTV 100 is located in the DLNA network. For example, the DTV 100 may mutually communicate with the replacement electronic devices in the DLNA network.

For example, the controller 180 may acquire a degree of power that is being currently consumed. Also, the controller 180 may acquire a degree of power consumed when the replacement electronic devices play the contents. The controller 180 may acquire power consumption information of the replacement electronic devices directly from the replacement electronic devices or via the smart meter 20 or the EMS 30. The controller 180 may search the replacement electronic devices consuming less power based on the acquired power consumption information.

The controller 180 may determine whether the current time is in a third mode or in a fourth mode (S855).

The third mode may be a mode in which the searched replacement electronic devices are shown to the user and the user selects the replacement electronic devices.

The fourth mode may be a mode in which the controller 180 selects a proper replacement electronic device among the searched replacement electronic devices based on a predetermined criterion.

It may be set by the user or may be preset in the controller 180 whether the current time is in the third mode or in the fourth mode.

Figure 10A:
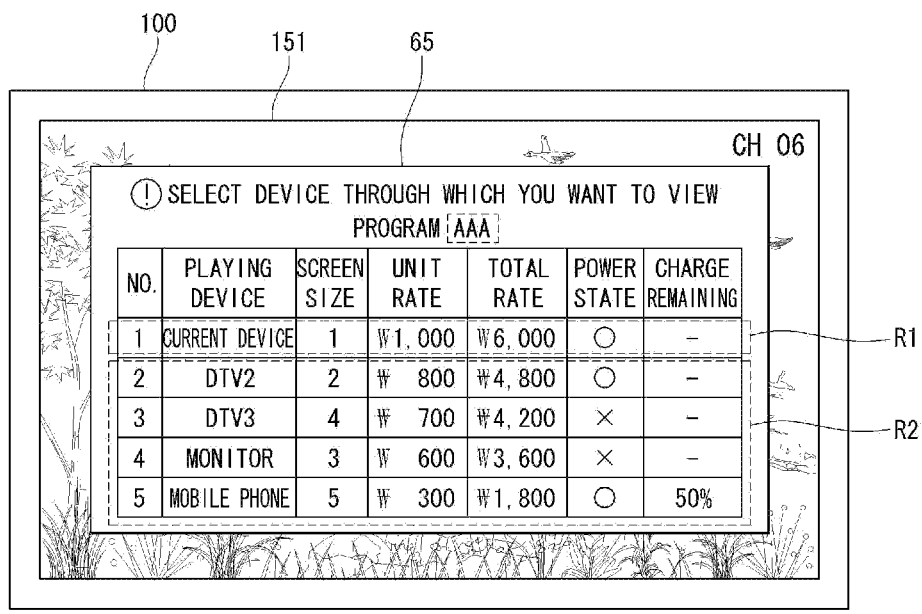

When it is determined in step S855 that the current time is in the third mode, the controller 180 may provide a second user interface 65 shown in FIG. 10A (S860).

The second user interface 65 may provide the user with a list of the searched replacement electronic devices. The controller 180 may provide the second user interface 65 to the user through the output unit 150.

Figure 10B:
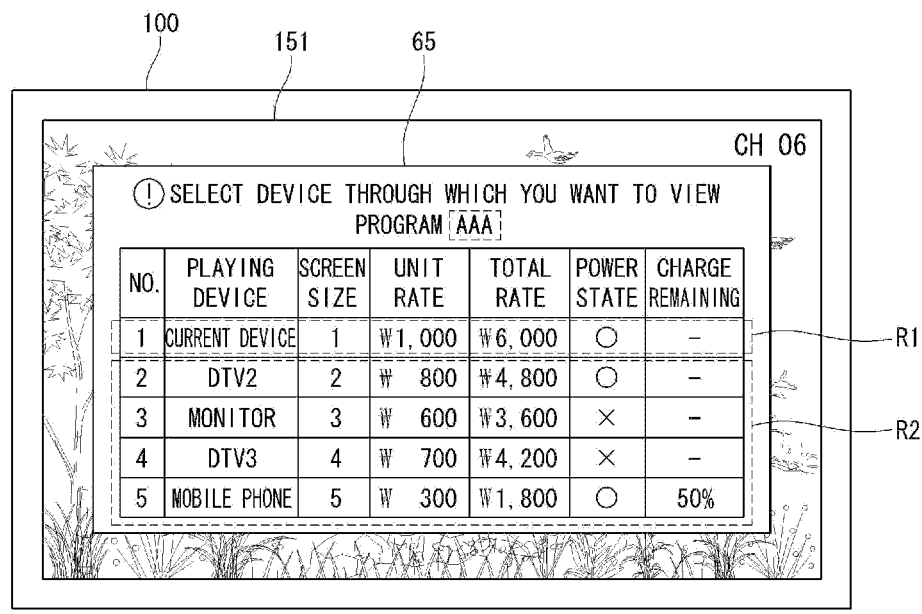
Figure 10C:
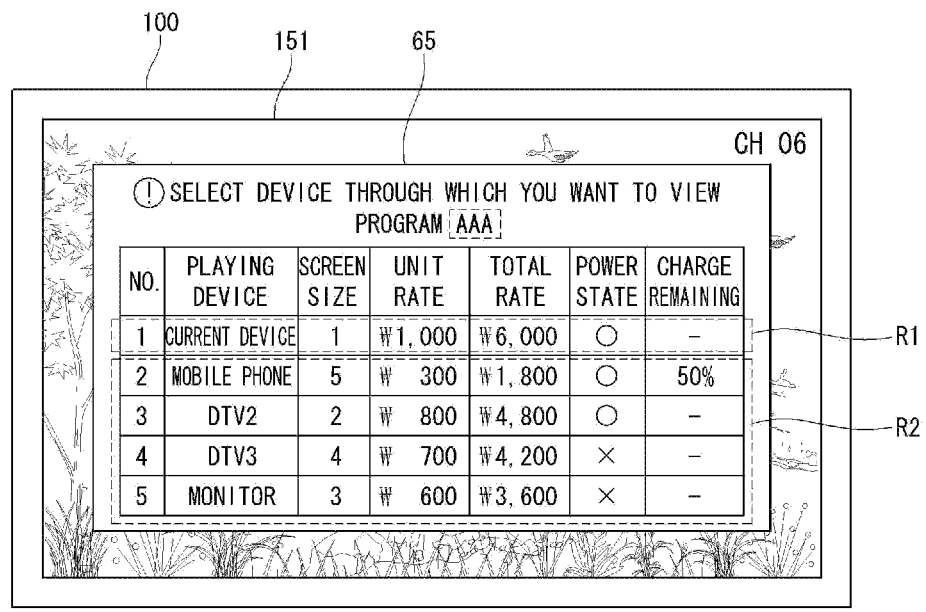

FIGS. 10A to 10C illustrate an example of the second user interface 65.

Referring to FIG. 10A, the controller 180 may provide a list of replacement electronic devices through the second user interface 65. The list may include the replacement electronic devices, screen sizes of the replacement electronic devices, unit electricity rates and total electricity rates of the replacement electronic devices, power states of the replacement electronic devices, whether the replacement electronic devices are portable terminals (not shown), charge remaining of the portable terminals, and how long the contents may be played with the charge remaining (not shown). According to an embodiment, the list may further include information on a criterion necessary for the user to select any one of the replacement electronic devices.

As described above, the replacement electronic devices may be electronic devices that have a lower degree of power consumption than the DTV 100 currently playing the contents. For example, the replacement electronic devices may be electronic devices that have a lower degree of power consumption and are positioned in a specific network to which the DTV 100 belongs, for example, the DLNA network. The second user interface 65 may provide a list of the replacement electronic devices.

The screen size refers to a size of screen on which the contents are displayed. Referring to FIG. 10A, as the number decreases, the screen size increases. For example, the DTV 100 currently playing the contents has the largest screen size and the mobile phone has the smallest screen size.

The unit electricity power may refer to an electricity rate per unit time for power consumed when a replacement electronic device plays the contents. A reference value of the unit time may be arbitrarily determined by the user. The user may visually identify that electricity rates may be saved by playing the contents with the replacement electronic device.

The total rates may refer to electricity rates of power consumed when playing the contents during the remaining play time.

The power states may represent whether the replacement electronic devices are on or off. The controller 180 may transmit a necessary message to the replacement electronic devices to identify the power states of the replacement electronic devices. For example, when there is no response from the replacement electronic devices within a predetermined time, the replacement electronic devices are determined to be off. Or, the controller 180 may acquire information on the power states of the replacement electronic devices from, for example, a certain managing server. The power states may include information on whether it is necessary to let the user turn on the replacement electronic devices. When it is determined based on the power states that the replacement electronic devices are off, the user may realize that he needs to manually or remotely turn on the replacement electronic devices.

Whether the replacement electronic devices are portable terminals may refer to information on whether the replacement electronic devices have mobility. Whether the replacement electronic devices are portable terminals may be previously determined for each or every electronic device or may be arbitrarily determined by the user. The controller 180 may determine whether the replacement electronic devices are portable terminals by querying the replacement electronic devices whether the replacement electronic devices are portable terminals.

The charge remaining may refer to information on how much power was electrically charged to the replacement electronic devices in a case where the replacement electronic devices are portable terminals. The controller 180 may identify the charge remaining by requesting the replacement electronic devices to send the charge remaining and periodically receiving the charge remaining from the replacement electronic devices.

Referring to R1 of FIG. 10A, the user may identify what device is currently playing the contents and that the screen size is 1, the unit power rate is 1000 Won, and the total rate is 6000 Won through the list of replacement electronic devices.

Referring to R2 of FIG. 10A, the user may identify information on the replacement electronic devices. For example, the user may identify that a DTV3 has a screen size of 4 and is now off. The user may also identify that a mobile phone has a screen size of 5, which is smallest, is now on, and has a charge remaining of 50%. In a case where the charge remaining is 50% as described above, additional information may also be displayed that indicates how many minutes the contents are further played.

The user may determine which replacement electronic device may save electricity rate by comparing R1 with R2. The user may also determine which replacement electronic device is proper for him based on R2. For example, DTV2 has a higher unit rate than that of DTV3, but the screen size of DTV2 is larger than that of DTV3. The user may select one of DTV2 and DTV3 based on his preferred factor between the unit electricity free and the screen size.

FIGS. 10B and 10C illustrates user interfaces according to embodiments of the present invention.

Returning to FIG. 10A, the replacement electronic devices are sorted in descending order of the unit electricity rates. Referring to FIG. 10B, the replacement electronic devices are sorted in descending order of the screen sizes, and referring to FIG. 10C, the replacement electronic devices are sorted in descending order of frequencies of use. According to an embodiment, while providing the second user interface 65, the controller 180 may make a sort based on the screen sizes, the unit electricity rates, the frequencies of having selected the replacement electronic devices, the power states, whether the replacement electronic devices are portable terminals, the charge remaining, and how long the contents may be played with the charge remaining.

For example, a list of replacement electronic devices may be provided to the user suitably for user's convenience, so that the user may easily select the replacement electronic devices.

Figure 11:
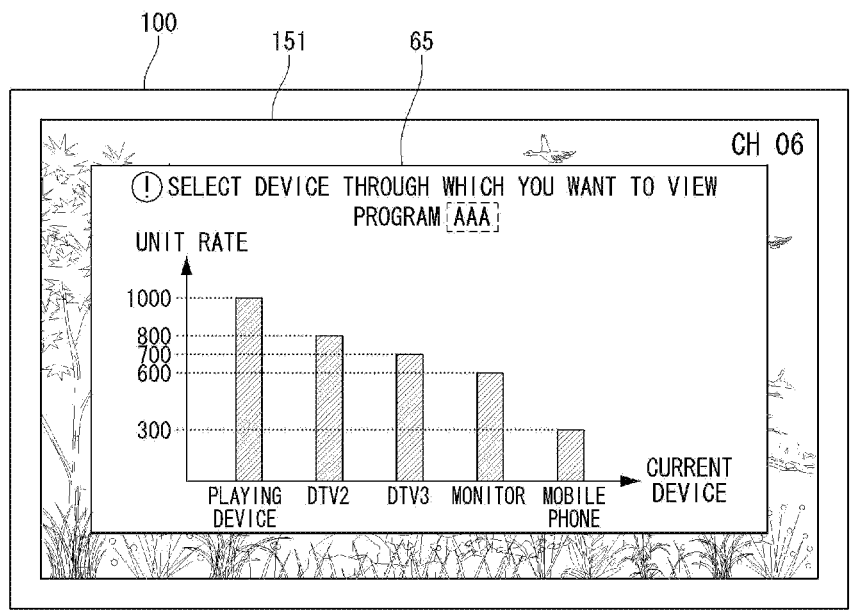

FIG. 11 illustrates a second user interface 65 according to an embodiment of the present invention.

Referring to FIG. 11, the second user interface 65 provides a graph for the unit electricity rates and the replacement electronic devices so that the user may visibly and easily determine which replacement electronic device has a low unit rate. The unit rates shown in FIG. 11 are merely examples and may be varied based on user's preference.

The controller 180 may enable the user to select a replacement electronic device through the second user interface 65 (S870).

For example, the user may select one of the replacement electronic devices displayed on the second user interface 65 through the remote controller 190. When a replacement electronic device is selected by the user in step S870, the controller 180 may enable contents to be played by the selected replacement electronic device (S880).

When it is determined in step S855 that the current time is in the fourth mode, the controller 180 may enter into step S880.

In the fourth mode, the controller 180 may automatically select a replacement electronic device. In the fourth mode, the controller 180 may select one of the replacement electronic devices by a predetermined method.

For example, among the replacement electronic devices, the controller 180 may select a replacement electronic device consuming least power for outputting the contents, a replacement electronic device most often selected by the user, the portable terminal which is an electronic device designated by the user, a replacement electronic device consuming less power than the DTV 100 currently outputting the contents and having a second largest screen next to the DTV 100, or a replacement electronic device having charge remaining most.

For example, the controller 180 may determine whether the current time belongs to the high rate time slot based on a plurality of reference values, including a first reference value and a second reference value higher than the first reference value. When it is determined based on the first reference value that the current time belongs to the high rate time slot, the controller 180 may select an A electronic device, and when it is determined based on the second reference value that the current time belongs to the high rate time slot, the controller 180 may select a B electronic device consuming less power than the A electronic device.

For example, the controller 180 may select a replacement electronic device located nearest the DTV 100 currently outputting the contents. For example, the controller 180 may acquire the location of the replacement electronic device through a camera included in the DTV 100 or a camera to be connected to the home network.

After a replacement electronic device to output the contents is selected in the above process, the controller 180 may output a control signal related to outputting the contents by the selected replacement electronic device.

The control signal may include at least one of notification information notifying an information that the selected replacement electronic device will play the contents, charge remaining information of the selected replacement electronic device, and power state information of the selected replacement electronic device.

Figure 12:
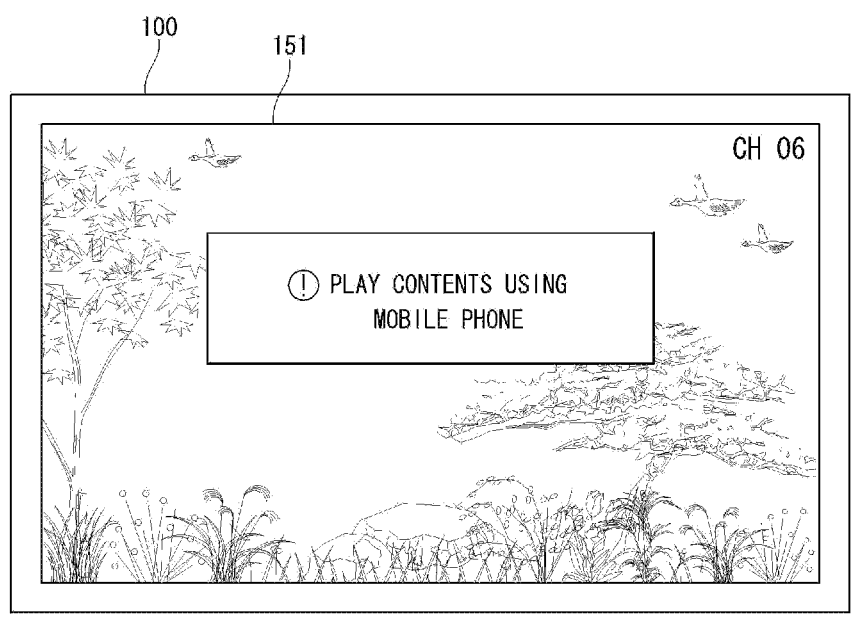

Referring to FIG. 12, in a case where a mobile phone is selected as a replacement electronic device, the controller 180 may notify the user that the mobile phone was selected as the replacement electronic device by providing the notification information through the output unit 150. Accordingly, the user may identify the selected replacement electronic device once again.

Figure 13:
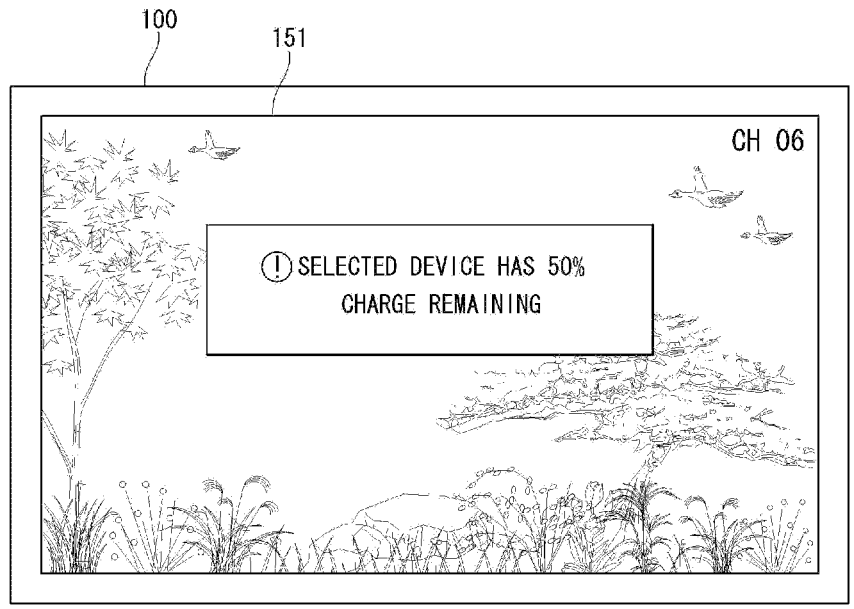

Referring to FIG. 13, the controller 180 may notify the user of charge remaining by providing the charge remaining information through the output unit 150. For example, in a case where the selected replacement electronic device is a portable terminal, the controller 180 may provide user convenience by notifying the user of the charge remaining. Although not shown, the controller 180 may also notify the user how much further the contents may be played with the charge remaining.

The control signal may also include at least one of source information of the contents and an ON command of the selected replacement electronic device. The controller 180 may transmit the source information of the contents and the ON command of the selected replacement electronic device to the selected replacement electronic device through the communication unit. The source information may include at least one of, for example, information on a website providing the contents, broadcast information including broadcast channels, and an IP address of an electronic device storing the contents.

In the case of outputting the contents by the selected replacement electronic device, the controller 180 may control power of the electronic device currently outputting the contents. For example, the controller 180 may turn off the electronic device or the output unit 150 of the electronic device currently outputting the contents.

The DTV 100 may have different power control based on the location of storing the contents currently outputted.

For example, in a case where the contents currently outputted are stored in the memory 160 of the DTV 100 while performing power control, the controller 180 may turn off the output unit 150. For example, the controller 180 may turn off the output unit 150 and may transmit the contents currently outputted to the selected replacement electronic device so that the selected replacement electronic device may play the contents.

For example, in a case where the contents currently outputted are stored in other devices than the DTV 100 during power control, the controller 180 may turn off the DTV 100, thus maximizing power saving effects.

The power control may be conducted not only by the controller 180 of the DTV 100 but also by the selected replacement electronic device. For example, in a case where the selected replacement electronic device controls the power of the DTV 100, the selected replacement electronic device may transmit a control signal to the DTV 100 when outputting the contents. In a case where the DTV 100 controls power, the controller 180 of the DTV may transmit a control signal to the selected replacement electronic device so that the selected replacement electronic device may output the contents and then may turn off the DTV 100 or the output unit or the DTV 100.

Figure 14:
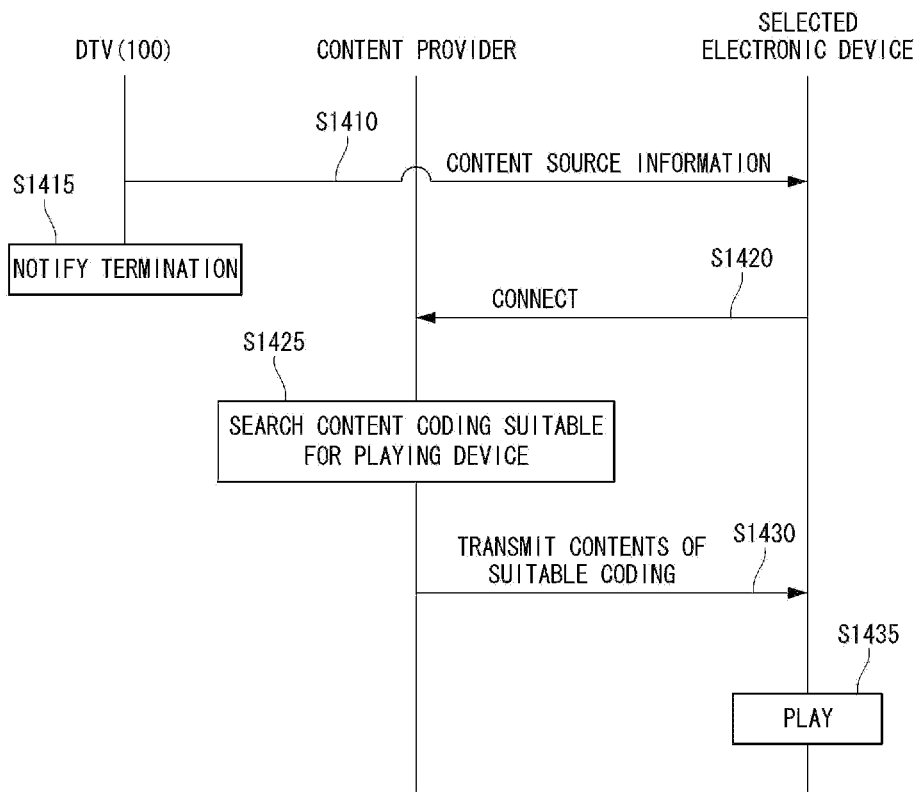

FIG. 14 is a flowchart illustrating an example of playing the contents by the selected replacement electronic device based on the source information. A content provider shown in FIG. 14 may be integrated with the DTV 100 or provided separately from the DTV 100. The content provider may also be referred to by the DMS 210. Hereinafter, it is assumed that the content provider is a separate device from the DTV 100.

Referring to FIG. 14, the DTV 100 may transmit content source information to the selected replacement electronic device through the communication unit 130 (S1410). For example, the DTV 100 may transmit the content source information including an IP address of the selected replacement electronic device to the selected replacement electronic device.

The source information may include an IP address of the content provider and an address for identifying the contents.

After the transmission of the content source information, the DTV 100 may terminate its operation (S1415). According to an embodiment, the DTV 100 may terminate its operation after the content source information is transmitted to the selected replacement electronic device without errors. Before termination, the controller 180 may display a termination message notifying the user of the termination through the display unit 151.

The selected replacement electronic device may connect to the content provider based on the received content source information (S1420). The content provider may search the contents having, for example, coding or formats that may be played by the selected replacement electronic device (S1425).

For example, the content provider may search the contents for the selected replacement electronic device using information on coding or formats of the contents that may be played by the selected replacement electronic device, wherein the information on coding or formats may be transmitted to the content provider when the selected replacement electronic device connects to the content provider.

For example, the content provider may search the contents for the selected replacement electronic device based on previously stored information on the selected replacement electronic device.

For example, the controller 180 may perform the process by transmitting a command for querying device characteristics to the selected replacement electronic device.

In the absence of content coding suitable for the selected replacement electronic device, the content provider may perform a separate trans-coding process. In the presence of a content format fitting for the selected replacement electronic device, the content provider need not carry out a separate trans-coding process as long as the contents are transmitted in the format.

The content provider may transmit the searched contents to the selected replacement electronic device (S1430). For example, the content provider may transform the contents outputted by the DTV 100 to be outputted by the selected replacement electronic device and then may transmit the transformed contents to the selected replacement electronic device.

The selected replacement electronic device may play the received contents (S1435).

Although it has been described above that the content provider is separate from the DTV 100, the content provider may be integrated with the DTV 100. In such a case, the DTV 100 may transmit one of original data before the contents are decoded, decoded data, and date trans-coded to conform to device characteristics of the selected replacement electronic device to the selected replacement electronic device.

The original data may be a transport stream in the case that the contents are broadcast signals. The decoded data may be data decoded so that the transport stream may be played through the output unit. The controller 180 may perform trans-coding to comply with the device characteristics of the selected replacement electronic device by the above-described method.

As described above, the controller 180 may turn off the replacement electronic device or the output unit of the replacement electronic device based on the location of storing the contents. For example, the controller 180 may turn off the electronic device currently outputting the contents after the contents are determined to be played by the selected replacement electronic device, thus saving power. Alternatively, after the content source information or the stream for playing the contents are transmitted to the selected replacement electronic device, the controller 180 may turn off the output unit. The controller 180 may allow the user to seamlessly view the contents.

When the selected replacement electronic device is off state, the controller 180 may transmit an ON command to the selected replacement electronic device. The controller 180 may acquire a power state of the selected replacement electronic device through the above-described process. By transmitting the ON command to the selected replacement electronic device that is in the off state, the controller 180 may enable the selected replacement electronic device to play the contents. For example, when the selected replacement electronic device is in an off state, the controller 180 may turn on the selected replacement electronic device and may transmit the source information to the selected replacement electronic device.

Also, the controller 180 may transmit the contents or contents transformed to be played by the selected replacement electronic device to the selected replacement electronic device.

Although it has been described in step S1410 that the DTV 100 transmits the source information of the contents to the selected replacement electronic device and the selected replacement electronic device receives the contents based on the source information, the embodiment of the present invention is not limited thereto. For example, the DTV 100 may request the content provider to allow the selected replacement electronic device to output the contents that are currently outputted by the DTV 100.

For example, the DTV 100 may provide an IP address of the selected replacement electronic device and an identifier of the contents to the content provider, and the content provider may transmit contents searched based on the received content identifier to the selected replacement electronic device identified based on the IP address.

Coding and power control of the DTV 100 and the selected replacement electronic device may be performed by the same process as described above.

The controller 180 may receive a time point, wherein the time point is point that the selected replacement electronic device starts to play the contents. For example, the controller 180 may receive information on whether to enable the selected replacement electronic device to start playing the contents from the time point or a predetermined time after the time point. The time point of the play of the contents may be a time point when the user inputs a play signal through the replacement electronic device.

Figure 15:
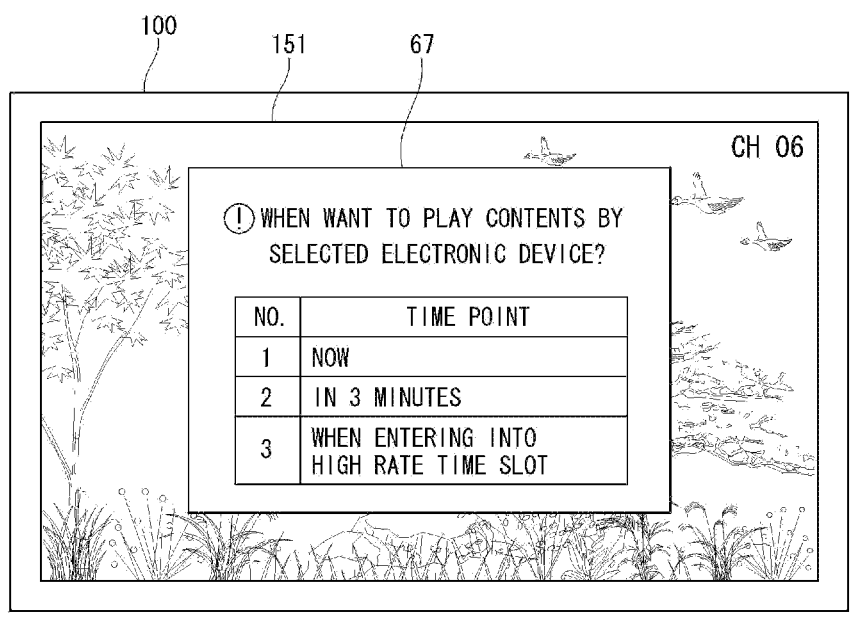

As shown in FIG. 15, the controller 180 may provide a third user interface 67 through the display unit 151 to select a time point for playing the contents. For example, the third user interface 67 may include, for example, "Now", "in three minutes", and "when entering into high rate time slot". It is assumed in an embodiment described in connection with FIG. 15 that the "when entering into high rate time slot" is "in five minutes".

When the user selects "Now", the controller 180 may enable the selected replacement electronic device to initiate playing the contents.

When the user selects "in three minutes", the controller 180 may enable the selected replacement electronic device to initiate playing the contents three minutes hence. The user may take time, for example, three minutes, to reach the location of the replacement electronic device.

When the user selects "when entering into high rate time slot", the controller 180 may output the contents through the DTV 100 until entering into the high rate time slot and when the high rate time slot arrives, may enable the replacement electronic device to play the contents.

When the contents are played by the selected replacement electronic device in step S880, the controller 180 may automatically or manually turn off the output unit 150. Accordingly, the DTV 100 may enable the contents to be played by the selected replacement electronic device consuming less power during the high rate time slot, thus saving power.

Setup of the various modes for the embodiments described herein may depend on the user. For example, the first and third modes, the first and fourth modes, the second and third modes, or the second and fourth modes may be set by the user for the embodiments.

The various embodiments described herein may be combined with one another in various manners.

The first to the third user interfaces, respectively, may be provided by each of separate graphic objects or a single graphic object.

It has been described above that other replacement electronic devices are searched and the searched replacement electronic device plays contents to save electricity rates. However, when a current time enters into a low rate time slot having a low electricity rate, electronic devices having a large screen size or consuming more power may be searched as the replacement electronic devices. Accordingly, an embodiment where a replacement electronic device is selected during the low rate time slot having a low electricity rate may also belong to the scope of the embodiments of the present invention.

When the high rate time slot terminates so that the electricity rate becomes lower than that of the high rate time slot while the replacement electronic device plays the contents, the replacement electronic device may provide a user interface querying the user whether he will view the contents through an electronic device that had outputted the contents before.

The embodiments of the present invention provide an electronic device that may reduce electricity rates by varying content output devices based on electricity rates.

The above-described method of controlling the electronic device may be written as computer programs and may be implemented in digital microprocessors that execute the programs using a computer readable recording medium.

The method of controlling the electronic device may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that can be thereafter read by a computer system. Examples of the computer readable recording medium may include read-only memory (ROM), random-access memory (RAM), CD-ROMs, DVD±ROM, DVD-RAM, magnetic tapes, floppy disks, optical data storage devices. The computer readable recording medium may also be distributed over network coupled computer systems so that the computer readable code is stored and executed in a distribution fashion.

The foregoing embodiments and advantages are merely exemplary and are not to be construed as limiting the present invention. The present teaching can be readily applied to other types of apparatuses. The description of the foregoing embodiments is intended to be illustrative, and not to limit the scope of the claims. Many alternatives, modifications, and variations will be apparent to those skilled in the art.

What is claimed is:

1. An electronic device comprising:
   a communication unit;
   an output unit; and
   a controller configured to output at least one of a first user interface and a second user interface through the output unit, in a case of entering a high rate time slot determined based on electricity rate information received through the communication unit while outputting contents through the output unit,
   wherein the first user interface queries whether to continuously output the contents through the output unit and wherein the second user interface is to receive a selection associated with a replacement electronic device for outputting the contents.

2. The electronic device of claim 1, wherein the controller automatically outputs the second user interface after receiving an output stop signal of the contents through the first user interface.

3. The electronic device of claim 1, wherein whether to output the first and second user interfaces is set or varied by a user.

4. The electronic device of claim 1, wherein in a case where only the first user interface is set to be output among the first and second user interfaces, the controller automatically selects the replacement electronic device based on a predetermined criterion after receiving an output stop signal of the contents through the first user interface.

5. The electronic device of claim 4, wherein the controller outputs a control signal associated with outputting the contents by the selected replacement electronic device.

6. The electronic device of claim 1, wherein when the replacement electronic device is selected through the second user interface, the controller is configured to output a control signal associated with outputting the contents by the selected replacement electronic device.

7. The electronic device of claim 5, wherein the control signal includes at least one of notification information notifying an information that the selected replacement electronic device will play the contents, charge remaining information of the selected replacement electronic device, and power state information of the selected replacement electronic device.

8. The electronic device of claim 5, wherein the control signal includes source information of the contents, wherein the controller transmits the source information to the selected replacement electronic device through the communication unit.

9. The electronic device of claim 5, wherein the control signal includes an ON command signal for the selected replacement electronic device, wherein when the selected replacement electronic device is in an off state, the controller transmits the ON command signal to the selected replacement electronic device through the communication unit.

10. The electronic device of claim 1, wherein when the controller automatically selects the replacement electronic device based on a predetermined criterion after receiving an output stop signal of the contents through the first user interface, or the replacement electronic device is selected through the second user interface, the controller transmits the contents to the selected replacement electronic device in a form of one of original data before the contents are decoded, decoded data, and data trans-coded to conform to device characteristics of the selected replacement electronic device.

11. The electronic device of claim 1, wherein when the controller automatically selects the replacement electronic device based on a predetermined criterion after receiving an output stop signal of the contents through the first user interface, or the replacement electronic device is selected through the second user interface, the controller turns off the output unit.

12. The electronic device of claim 1, wherein the replacement electronic device consumes less power than the electronic device for outputting the contents.

13. The electronic device of claim 1, wherein the controller provides, through the second user interface, at least one of the replacement electronic device, a screen size of the replacement electronic device, a unit electricity rate of the replacement electronic device, a power state of the replacement electronic device, whether the replacement electronic device is a portable terminal, charge remaining of the replacement electronic device, and how long the contents may be played with the charge remaining.

14. An electronic device comprising:
   a communication unit;
   an output unit; and
   a controller configured to automatically selects a replacement electronic device to output contents in a case of entering a high rate time slot according to electricity rate information received through the communication unit, and when the selected replacement electronic device is in an off state, transmits an ON command for turning on the selected replacement electronic device and source information for providing the contents to the selected replacement electronic device through the communication unit, wherein the source information includes at least one of website information and broadcast information including a broadcast channel.

15. The electronic device of claim 14, wherein the replacement electronic device is at least one of an electronic device consuming a minimum electricity rate to output the contents, an electricity device having a highest frequency of use, an electronic device designated by a user, a portable terminal, and an electronic device that consumes less power than an electronic device currently outputting the contents and has a largest screen size.

16. The electronic device of claim 14, wherein the controller provides a fourth user interface that queries whether to the replacement electronic device outputs the contents, and when receiving a confirmation command through the fourth user interface, performs the transmission operation.

17. The electronic device of claim 14, wherein the controller outputs at least one of notification information notifying an information that the selected replacement electronic device will play the contents, charge remaining information of the selected replacement electronic device, and power state information of the selected replacement electronic device.

18. A method for changing content playing devices, the method comprising:
   outputting contents through an output unit;
   receiving electricity rate information through a communication unit; and
   outputting at least one of a first user interface and a second user interface through the output unit in a case entering a high rate time slot determined based on the electricity rate information received through the communication unit,
   wherein the first user interface queries whether to continuously outputs the contents through the output unit and wherein the second interface is to receive a selection associated with a replacement electronic device for outputting the contents.

19. A method of changing content playing devices comprising:
   outputting contents through an output unit;
   receiving electricity rate information through a communication unit;
   automatically selecting a replacement electronic device to output the contents in a case of entering a high rate time slot determined based on the received electricity rate information; and
   transmitting an ON command for turning on the selected replacement electronic device and source information for providing the contents to the selected replacement electronic device through the communication unit when the selected replacement electronic device is in an off state,
   wherein the source information includes at least one of website information and broadcast information including a broadcast channel.

* * * * *